United States Patent
Mukohata et al.

(10) Patent No.: US 11,279,810 B2
(45) Date of Patent: Mar. 22, 2022

(54) CROSSLINKED POLYVINYLIDENE FLUORIDE RESIN FOAM SHEET AND METHOD FOR PRODUCING SAME

(71) Applicant: SEKISUI CHEMICAL CO., LTD., Osaka (JP)

(72) Inventors: Daisuke Mukohata, Saitama (JP); Koji Shimonishi, Walled Lake, MI (US)

(73) Assignee: SEKISUI CHEMICAL CO., LTD., Osaka (JP)

(*) Notice: Subject to any disclaimer, the term of this patent is extended or adjusted under 35 U.S.C. 154(b) by 202 days.

(21) Appl. No.: 16/486,001

(22) PCT Filed: Feb. 27, 2018

(86) PCT No.: PCT/JP2018/007331
§ 371 (c)(1),
(2) Date: Aug. 14, 2019

(87) PCT Pub. No.: WO2018/159634
PCT Pub. Date: Sep. 7, 2018

(65) Prior Publication Data
US 2020/0062917 A1    Feb. 27, 2020

(30) Foreign Application Priority Data
Feb. 28, 2017  (JP) .............. JP2017-036984

(51) Int. Cl.
*C08J 9/10* (2006.01)
*C08J 9/00* (2006.01)

(52) U.S. Cl.
CPC .......... *C08J 9/103* (2013.01); *C08J 9/0061* (2013.01); *C08J 2201/026* (2013.01); *C08J 2203/04* (2013.01); *C08J 2205/044* (2013.01); *C08J 2205/052* (2013.01); *C08J 2323/08* (2013.01); *C08J 2327/16* (2013.01)

(58) Field of Classification Search
CPC .... C08J 9/103; C08J 9/0061; C08J 2201/026; C08J 2203/04; C08J 2205/044; C08J 2205/052; C08J 2323/08; C08J 2327/16; C08J 2205/04; C08J 2327/20
See application file for complete search history.

(56) References Cited

U.S. PATENT DOCUMENTS

| | | | |
|---|---|---|---|
| 4,737,526 A | | 4/1988 | Mukaiyama et al. |
| 2004/0138321 A1* | | 7/2004 | Hashimoto ............ C08J 9/0061 521/134 |
| 2007/0293592 A1* | | 12/2007 | Jacobs ..................... C08J 3/28 521/50.5 |
| 2008/0032080 A1 | | 2/2008 | Faulkner et al. |
| 2009/0202769 A1 | | 8/2009 | Masuda et al. |
| 2011/0319512 A1 | | 12/2011 | Sakaguchi et al. |
| 2014/0045959 A1 | | 2/2014 | Honda et al. |

FOREIGN PATENT DOCUMENTS

| | | |
|---|---|---|
| CN | 101065441 | 10/2007 |
| JP | 62-252435 | 11/1987 |
| JP | 63-280747 | 11/1988 |
| JP | 7-11037 | 1/1995 |
| JP | 7-149939 | 6/1995 |
| JP | 10-7833 | 1/1998 |
| JP | 2007-534823 | 11/2007 |
| WO | 2012/141154 | 10/2012 |

OTHER PUBLICATIONS

Extended European Search Report dated Sep. 21, 2020 in corresponding European Patent Application No. 18761022.5.
International Search Report dated May 22, 2018 in International (PCT) Application No. PCT/JP2018/007331.

* cited by examiner

*Primary Examiner* — Kara B Boyle
(74) *Attorney, Agent, or Firm* — Wenderoth, Lind & Ponack, L.L.P.

(57) ABSTRACT

The foamed sheet of the present invention is a foamed sheet obtained by crosslinking and foaming a polyvinylidene fluoride-based resin composition comprising a polyvinylidene fluoride-based resin, wherein the polyvinylidene fluoride-based resin comprises a vinylidene fluoride-hexafluoropropylene copolymer, a density of the foamed sheet is not more than 180 kg/cm$^3$, and an average cell diameter of the foamed sheet is not less than 100 μm and not more than 500 μm. According to the present invention, a crosslinked polyvinylidene fluoride-based resin foamed sheet having both good flame retardance and good flexibility and a process for producing the foamed sheet are provided.

10 Claims, No Drawings

CROSSLINKED POLYVINYLIDENE FLUORIDE RESIN FOAM SHEET AND METHOD FOR PRODUCING SAME

TECHNICAL FIELD

The present invention relates to a crosslinked polyvinylidene fluoride-based resin foamed sheet and a process for producing the same.

BACKGROUND ART

For cushioning materials used for chairs, beds, mats, flooring materials, etc., various functions are required according to the use application. Particularly for cushioning materials used for chairs (sheets) of public vehicles such as railway vehicles, good flexibility is required even in a severe usage environment where the cushioning materials are used for a long time every day. Moreover, in order to meet the flame retardant standard, good flame retardance is required.

In Patent Literature 1, a continuous sheet-like fluorine-based resin crosslinked foamed body produced by heating and foaming an ionizing radiation crosslinked product of a polyvinylidene fluoride-based resin at normal pressure is proposed. This foamed body has a 25% compressive hardness of 0.5 to 2 kg/cm$^2$, a moldability (L/D) of 0.3 to 0.8, a flame-retardant oxygen index of not less than 30, a degree of crosslinking of 20 to 80% and an expansion ratio of 3 to 50 times. It has been confirmed that the flame retardance, etc. of this foamed body are excellent.

In Patent Literature 2, a continuous sheet-like fluorine-based resin crosslinked foamed body comprising a polyvinylidene fluoride-based resin (A) and a fluorine-based resin (B) with a melting point higher than that of the polyvinylidene fluoride-based resin (A) by 30 to 200° C. and having prescribed properties is proposed from the viewpoints of good flame retardance and the like.

CITATION LIST

Patent Literature

PTL1: JP 07-11037 A
PTL2: JP 10-7833 A

SUMMARY OF INVENTION

Technical Problem

In these patent literatures, however, flexibility is not evaluated, and any guidelines for improvement in flexibility are not shown either.

Considering the above, it is an object of the present invention to provide a crosslinked polyvinylidene fluoride-based resin foamed sheet having both good flame retardance and good flexibility and a process for producing the foamed sheet.

Solution to Problem

That is to say, the present invention is as follows.

[1] A crosslinked polyvinylidene fluoride-based resin foamed sheet obtained by crosslinking and foaming a polyvinylidene fluoride-based resin composition comprising a polyvinylidene fluoride-based resin, wherein the polyvinylidene fluoride-based resin comprises a vinylidene fluoride-hexafluoropropylene copolymer, a density of the crosslinked polyvinylidene fluoride-based resin foamed sheet is not more than 180 kg/m$^3$, and an average cell diameter of the crosslinked polyvinylidene fluoride-based resin foamed sheet is not less than 100 μm and not more than 500 μm.

[2] The crosslinked polyvinylidene fluoride-based resin foamed sheet according to [1], wherein the number of cells within 3 mm width of the crosslinked polyvinylidene fluoride-based resin foamed sheet is not less than 5 and not more than 20.

[3] The crosslinked polyvinylidene fluoride-based resin foamed sheet according to [1] or [2], wherein cell diameters within 3 mm width of the crosslinked polyvinylidene fluoride-based resin foamed sheet satisfy the following formula:

{(maximum value of cell diameters within 3 mm width)−(minimum value of cell diameters within 3 mm width)}/(average cell diameter) ≤2.2.

[4] The crosslinked polyvinylidene fluoride-based resin foamed sheet according to any one of [1] to [3], having a 25% compression stress, based on JIS K 6767, of not more than 100 kPa and a hardness, based on ASTM D2240-05, of not more than 70.

[5] The crosslinked polyvinylidene fluoride-based resin foamed sheet according to any one of [1] to [4], wherein the vinylidene fluoride-hexafluoropropylene copolymer comprises not less than 25 mass % of a vinylidene fluoride-hexafluoropropylene copolymer having a melting point of not lower than 80° C. and not higher than 160° C.

[6] The crosslinked polyvinylidene fluoride-based resin foamed sheet according to any one of [1] to [5], wherein the polyvinylidene fluoride-based resin composition comprises a polyolefin-based resin, and a content of the polyolefin-based resin based on the total of the polyvinylidene fluoride-based resin and the polyolefin-based resin is not more than 50 mass %.

[7] The crosslinked polyvinylidene fluoride-based resin foamed sheet according to any one of [1] to [6], having a degree of crosslinking of not less than 5 mass % and not more than 70 mass %.

[8] The crosslinked polyvinylidene fluoride-based resin foamed sheet according to any one of [1] to [7], wherein the polyvinylidene fluoride-based resin composition further comprises a thermal decomposition type blowing agent.

[9] The crosslinked polyvinylidene fluoride-based resin foamed sheet according to any one of [1] to [8], wherein the polyvinylidene fluoride-based resin composition further comprises a crosslinking aid.

[10] A process for producing the crosslinked polyvinylidene fluoride-based resin foamed sheet according to any one of [1] to [9], comprising in this order: (A) melt-kneading a polyvinylidene fluoride-based resin comprising a vinylidene fluoride-hexafluoropropylene copolymer and a thermal decomposition type blowing agent and forming the resulting kneaded material into a sheet-like shape to produce a foamable polyvinylidene fluoride-based resin sheet; (B) crosslinking the foamable polyvinylidene fluoride-based resin sheet; and (C) heating the crosslinked foamable polyvinylidene fluoride-based resin sheet to foam the resin sheet.

Advantageous Effects of Invention

According to the present invention, a crosslinked polyvinylidene fluoride-based resin foamed sheet having both good flame retardance and good flexibility and a process for producing the foamed sheet can be provided.

DESCRIPTION OF EMBODIMENTS

Embodiments of the present invention are described in detail hereafter, but the present invention is in no way limited to the embodiments.

[1] Crosslinked Polyvinylidene Fluoride-based Resin Foamed Sheet

The crosslinked polyvinylidene fluoride-based resin foamed sheet according to an embodiment of the present invention is obtained by crosslinking and foaming a polyvinylidene fluoride-based resin composition comprising a polyvinylidene fluoride-based resin. That is to say, the crosslinked polyvinylidene fluoride-based resin foamed sheet according to the embodiment of the present invention is a sheet-like crosslinked foamed product of the polyvinylidene fluoride-based resin composition.

The polyvinylidene fluoride-based resin comprises a vinylidene fluoride-hexafluoropropylene copolymer. Since the polyvinylidene fluoride-based resin comprises the vinylidene fluoride-hexafluoropropylene copolymer, the crosslinked polyvinylidene fluoride-based resin foamed sheet can be allowed to exhibit good flexibility while flame retardance of the crosslinked polyvinylidene fluoride-based resin foamed sheet is favorably maintained. Owing to the presence of a hexafluoropropylene-derived component, the vinylidene fluoride-hexafluoropropylene copolymer becomes a copolymer having a low degree of crystallization. Moreover, it is thought that hexafluoropropylene contains a large amount of fluorine in its structure, and therefore, it has a high flexibility-imparting effect as compared with other polyvinylidene fluoride-based resins.

From the viewpoint that the crosslinked polyvinylidene fluoride-based resin foamed sheet easily exhibits flexibility, the content of the vinylidene fluoride-hexafluoropropylene copolymer in the polyvinylidene fluoride-based resin is preferably not less than 40 mass %, more preferably not less than 60 mass %, still more preferably not less than 80 mass %, and particularly preferably 100 mass %.

The vinylidene fluoride-hexafluoropropylene copolymer can be prepared by, for example, an emulsion polymerization method or a suspension polymerization method. However, a commercially available product can be used as the vinylidene fluoride-hexafluoropropylene copolymer. Examples of the commercially available products include trade names KYNAR 2500-20, 2750-01, 2800-20, 2800-00 and 2850-20 manufactured by Arkema K.K., and trade names Solef 11010, 21510 and 31508 manufactured by Solvey Specialty Polymers Japan K.K.

The density of the crosslinked polyvinylidene fluoride-based resin foamed sheet is not more than 180 kg/m$^3$, preferably not less than 10 kg/m$^3$ and not more than 160 kg/m$^3$, more preferably not less than 20 kg/m$^3$ and not more than 120 kg/m$^3$, still more preferably not less than 30 kg/m$^3$ and not more than 100 kg/m$^3$, and particularly preferably not less than 40 kg/m$^3$ and not more than 80 kg/m$^3$. If the density exceeds 180 kg/m$^3$, good flexibility is not obtained. Since the density is not less than 10 kg/m$^3$, mechanical strength of the crosslinked polyvinylidene fluoride-based resin foamed sheet is easily enhanced. The density can be determined by the method described in the working examples.

The crosslinked polyvinylidene fluoride-based resin foamed sheet of the present embodiment preferably has a 25% compression stress, based on JIS K 6767, of not more than 100 kPa and a hardness, based on ASTM D2240-05, of not more than 70. Since the 25% compression stress is not more than 100 kPa and the hardness is not more than 70, a crosslinked polyvinylidene fluoride-based resin foamed sheet having better flexibility can be obtained. It is more preferable that the 25% compression stress is not less than 15 kPa and not more than 70 kPa and the hardness is not less than 30 and not more than 65. The 25% compression stress and the hardness can be determined by the methods described in the working examples.

The vinylidene fluoride-hexafluoropropylene copolymer according to the present embodiment preferably comprises not less than 25 mass % of a vinylidene fluoride-hexafluoropropylene copolymer having a melting point of not lower than 80° C. and not higher than 160° C. Since the vinylidene fluoride-hexafluoropropylene copolymer according to the present embodiment comprises not less than 25 mass % of a vinylidene fluoride-hexafluoropropylene copolymer having a melting point of not lower than 80° C. and not higher than 160° C., desired flexibilities according to various uses can be imparted to the crosslinked polyvinylidene fluoride-based resin foamed sheet. The content of the vinylidene fluoride-hexafluoropropylene copolymer having a melting point of not lower than 80° C. and not higher than 160° C. in the whole vinylidene fluoride-hexafluoropropylene copolymer is more preferably not less than 50 mass %, still more preferably not less than 80 mass %, and most preferably 100 mass %.

The melting point is a temperature corresponding to a melting peak given when the temperature is raised at a rate of 10° C./min using a differential scanning calorimeter (DSC).

In the copolymer, the copolymerization ratio of vinylidene fluoride to hexafluoropropylene (vinylidene fluoride/hexafluoropropylene, by mass) is preferably 95/5 to 70/30, and more preferably 90/10 to 75/25. Since the ratio is 95/5 to 70/30, a crosslinked polyvinylidene fluoride-based resin foamed sheet having better flexibility can be obtained.

The polyvinylidene fluoride-based resin according to the present embodiment may further contain at least one polymer selected from the group consisting of polyvinylidene fluoride, a vinylidene fluoride-tetrafluoroethylene copolymer, a vinylidene fluoride-chlorotrifluoroethylene copolymer, and mixtures of two or more of them. By allowing the resin to appropriately contain them, desired flexibilities according to various uses can be imparted to the crosslinked polyvinylidene fluoride-based resin foamed sheet. Depending upon the polymer added, heat resistance of the crosslinked polyvinylidene fluoride-based resin foamed sheet can be enhanced.

The polyvinylidene fluoride-based resin composition may contain other resin components in a ratio of not more than 50 mass % to the total of the polyvinylidene fluoride-based resin and the other resin components. The other resin components are preferably polyolefin-based resins. When the polyvinylidene fluoride-based resin composition contains a polyolefin-based resin, a content of the polyolefin-based resin based on the total of the polyvinylidene fluoride-based resin and the polyolefin-based resin is preferably not more than 50 mass %.

The polyolefin-based resin has a lower density than the polyvinylidene fluoride-based resin, and therefore, lightening of the sheet can be attained. Moreover, cost reduction of the sheet can also be attained. Furthermore, flexibility of the sheet can be further improved. The content of the polyolefin-based resin is more preferably not more than 25 mass %.

Here, the polyolefin-based resin is preferably at least one resin selected from the group consisting of polypropylene-based resins and polyethylene-based resins.

Examples of the polypropylene-based resins employable herein include homopolypropylene, a propylene-ethylene copolymer, a propylene-butene copolymer, a propylene-ethylene-butene copolymer and block polypropylene. Examples of the polyethylene-based resins employable herein include high-density polyethylene, linear low-density polyethylene, low-density polyethylene and ethylene-based copolymers (ethylene-vinyl acetate copolymer, ethylene-acrylate copolymer, etc.). The density of the high-density polyethylene is preferably not less than 0.94 g/cm$^3$ and not more than 0.97 g/cm$^3$, and the densities of the linear low-density polyethylene and the low-density polyethylene are each preferably not less than 0.90 g/cm$^3$ and not more than 0.93 g/cm$^3$.

The crosslinked polyvinylidene fluoride-based resin foamed sheet according to the present embodiment is obtained by crosslinking and foaming, and the degree of crosslinking of the sheet is preferably not less than 5 mass % and not more than 70 mass %, and more preferably not less than 10 mass % and not more than 60 mass %. Since the degree of crosslinking is not less than 5 mass % and not more than 70 mass %, moldability in the molding of the polyvinylidene fluoride-based resin composition into a sheet-like shape can be enhanced. When the degree of crosslinking is not less than the lower limit, it becomes possible to properly carry out foaming using a thermal decomposition type blowing agent described later. The degree of crosslinking can be determined by the following method.

[Degree of Crosslinking]

From the crosslinked polyvinylidene fluoride-based foamed sheet, a test piece of about 100 mg is sampled, and the weight A (mg) of the test piece is precisely measured. Next, this test piece is immersed in 30 cm$^3$ of N,N-dimethylformamide at 120° C. and allowed to stand for 24 hours, thereafter, filtration is carried out using a 200-mesh wire cloth, then the insoluble component on the wire cloth is collected and vacuum dried, and the weight B (mg) of the insoluble component is precisely measured. Using the resulting values, the degree of crosslinking (mass %) is calculated from the following formula.

Degree of crosslinking (mass %)=100×(*B/A*)

The polyvinylidene fluoride-based resin composition according to the present embodiment preferably further comprises a thermal decomposition type blowing agent. Since the composition comprises a thermal decomposition type blowing agent, it becomes easy to control the number of cells within 3 mm width and the cell diameters within 3 mm width described later. Examples of the thermal decomposition type blowing agent include an organic blowing agent and an inorganic blowing agent. Examples of the organic blowing agents include azodicarbonamide, azodicarboxylic acid metal salts (barium azodicarboxylate, etc.), azo compounds such as azobisisobutyronitrile, nitroso compounds such as N,N'-dinitrosopentamethylenetetramine, hydrazine derivatives such as hydrazodicarbonamide, 4,4'-oxybis(benzenesulfonyl hydrazide) and toluenesulfonyl hydrazide, and semicarbazide compounds such as toluenesulfonyl semicarbazide.

Examples of the inorganic blowing agents include ammonium carbonate, sodium carbonate, ammonium hydrogencarbonate, sodium hydrogencarbonate, ammonium nitrite, sodium boron hydride and anhydrous citric acid monosodium salt.

Of these, azo compounds are preferable, and azodicarbonamide is particularly preferable, from the viewpoint of obtaining fine cells and the viewpoints of economy and safety. These thermal decomposition type blowing agents can be used singly or in combination of two or more kinds.

The amount of the thermal decomposition type blowing agent compounded in the polyvinylidene fluoride-based resin composition is preferably not less than 1 part by mass and not more than 24 parts by mass, more preferably not less than 5 parts by mass and not more than 22 parts by mass, and still more preferably not less than 10 parts by mass and not more than 20 parts by mass, based on 100 parts by mass of the polyvinylidene fluoride-based resin.

The polyvinylidene fluoride-based resin composition according to the present embodiment preferably further comprises a crosslinking aid. Examples of the crosslinking aids include divinylbenzene, trimethylolpropane trimethacrylate, 1,9-nonanediol dimethacrylate, 1,10-decanediol dimethacrylate, trimellitic acid triallyl ester, triallyl isocyanurate, ethylvinylbenzene, neopentyl glycol dimethacrylate, 1,2,4-benzenetricarboxylic acid triallyl ester, 1,6-hexanediol dimethacrylate, lauryl methacrylate, stearyl methacrylate, diallyl phthalate, diallyl terephthalate and diallyl isophthalate. These may be used singly or in combination of two or more kinds.

The amount of the crosslinking aid compounded in the polyvinylidene fluoride-based resin composition is preferably not less than 0.01 parts by mass and not more than 5 parts by mass, and more preferably not less than 0.1 parts by mass and not more than 3 parts by mass, based on 100 parts by mass of the polyvinylidene fluoride-based resin.

To the polyvinylidene fluoride-based resin composition according to the present embodiment, additives, for example, antioxidants such as 2,6-di-t-butyl-p-cresol, blowing aids such as zinc oxide, cell nucleus adjustors, heat stabilizers, colorants, flame retardants, antistatic agents and fillers, may be added, when needed. By particularly adding an antioxidant, foamability is improved, and density is lowered, so that a crosslinked polyvinylidene fluoride-based resin foamed sheet having better flexibility is easily obtained.

The crosslinked polyvinylidene fluoride-based resin foamed sheet according to the present embodiment preferably has the following structure.

(Average Cell Diameter)

The average cell diameter of the crosslinked polyvinylidene fluoride-based resin foamed sheet is not less than 100 μm and not more than 500 μm, and preferably not less than 150 μm and not more than 380 μm. If the average cell diameter of the crosslinked polyvinylidene fluoride-based resin foamed sheet is smaller than 100 μm or larger than 500 μm, a crosslinked polyvinylidene fluoride-based resin foamed sheet having good flexibility may not been obtained. The average cell diameter can be determined by the method described in the working examples. The average cell diameter can be controlled by known techniques such as adjustment of the viscosity of the polyvinylidene fluoride-based resin, the irradiation conditions of electron rays, and the type and the amount of the thermal decomposition type blowing agent.

(Number of Cells within 3 mm Width)

The number of cells within 3 mm width of the crosslinked polyvinylidene fluoride-based resin foamed sheet is preferably not less than 5 and not more than 20, and more preferably not less than 6 and not more than 16. When the number of cells within 3 mm width of the crosslinked polyvinylidene fluoride-based resin foamed sheet is not less than 5 and not more than 20, a crosslinked polyvinylidene fluoride-based resin foamed sheet having better flexibility can be obtained. The number of cells within 3 mm width can be determined by the method described in the working examples.

(Cell Diameters within 3 mm Width)

The cell diameters within 3 mm width of the crosslinked polyvinylidene fluoride-based resin foamed sheet preferably satisfy the following formula (1), and more preferably satisfy the following formula (2). When the cell diameters within 3 mm width of the crosslinked polyvinylidene fluoride-based resin foamed sheet satisfy the following formula (1) or the following formula (2), a crosslinked polyvinylidene fluoride-based resin foamed sheet having better flexibility can be obtained. The maximum value of cell diameters within 3 mm width, the minimum value of cell diameters within 3 mm width and the average cell diameter can be determined by the method described in the working examples.

$$\{(\text{maximum value of cell diameters within 3 mm width}) - (\text{minimum value of cell diameters within 3 mm width})\}/(\text{average cell diameter}) \leq 2.2 \quad (1)$$

$$\{(\text{maximum value of cell diameters within 3 mm width}) - (\text{minimum value of cell diameters within 3 mm width})\}/(\text{average cell diameter}) \leq 2.0 \quad (2)$$

It is preferable that the cell diameters within 3 mm width of the crosslinked polyvinylidene fluoride-based resin foamed sheet satisfy the formula (1) or the formula (2) and further satisfy the following formula (3).

$$\{(\text{maximum value of cell diameters within 3 mm width}) - (\text{minimum value of cell diameters within 3 mm width})\}/(\text{average cell diameter}) \geq 0.1 \quad (3)$$

(Thickness)

The thickness of the crosslinked polyvinylidene fluoride-based resin foamed sheet is preferably not less than 0.1 mm and not more than 50 mm. By specifying the thickness to such a range, it becomes possible to enhance durability of the crosslinked polyvinylidene fluoride-based resin foamed sheet, such as impact resistance, while ensuring flexibility of the foamed sheet. The thickness of the crosslinked polyvinylidene fluoride-based resin foamed sheet is more preferably not less than 1 mm and not more than 40 mm, and still more preferably not less than 2 mm and not more than 25 mm.

(Closed Cell Ratio)

The cells of the crosslinked polyvinylidene fluoride-based resin foamed sheet are preferably closed cells. That the cells are closed cells means the ratio of closed cells to all cells (referred to as a closed cell ratio) is not less than 70%. The closed cell ratio is preferably not less than 80%, and more preferably not less than 90%.

The closed cell ratio can be determined in accordance with ASTM D2856 (1998). A commercially available measuring device is, for example, a dry automatic densitometer ACUPIC 1330.

[2] Process For Producing Crosslinked Polyvinylidene Fluoride-Based Resin Foamed Sheet An embodiment according to the process for producing a crosslinked polyvinylidene fluoride-based resin foamed sheet of the present invention is a process for producing the crosslinked polyvinylidene fluoride-based resin foamed sheet of the present invention, and comprises the following steps (A) to (C) in this order.

(A) Melt-kneading a polyvinylidene fluoride-based resin comprising a vinylidene fluoride-hexafluoropropylene copolymer and a thermal decomposition type blowing agent and forming the resulting kneaded material into a sheet-like shape to produce a foamable polyvinylidene fluoride-based resin sheet.

(B) Crosslinking the foamable polyvinylidene fluoride-based resin sheet.

(C) Heating the crosslinked foamable polyvinylidene fluoride-based resin sheet to foam the resin sheet.

The steps are described below.

Step (A):

First, a polyvinylidene fluoride-based resin comprising a vinylidene fluoride-hexafluoropropylene copolymer and a thermal decomposition type blowing agent are melt-kneaded by, for example, feeding them to a known extruder. In the melt-kneading, other resin components, additives, etc. may be added, when needed. From the viewpoint that the crosslinked polyvinylidene fluoride-based resin foamed sheet easily exhibits flexibility, the content of the vinylidene fluoride-hexafluoropropylene copolymer in the polyvinylidene fluoride-based resin is preferably not less than 40 mass %, more preferably not less than 60 mass %, still more preferably not less than 80 mass %, and particularly preferably 100 mass %.

Thereafter, the resulting kneaded material is extruded into a sheet-like shape from an extruder or the like, thereby producing a foamable polyvinylidene fluoride-based resin sheet.

Step (B):

The foamable polyvinylidene fluoride-based resin sheet having passed through the step (A) is crosslinked. Examples of methods to crosslink the resin sheet include a method of irradiating the foamable polyvinylidene fluoride-based resin sheet with ionizing radiation and a method including adding an organic peroxide to a foamable polyvinylidene fluoride-based resin composition in advance and heating the resulting foamable polyvinylidene fluoride-based resin sheet to decompose the organic peroxide, and these methods may be used in combination.

For the irradiation with ionizing radiation, a method of irradiating the resin sheet with ionizing radiation such as electron ray, α-ray, β-ray or γ-ray is used. The absorption dose of the ionizing radiation only needs to be a dose of such a degree as can foam the resin sheet, but is preferably not less than 15 kGy and not more than 80 kGy, and more preferably not less than 30 kGy and not more than 60 kGy.

The acceleration voltage of the ionizing radiation only needs to be appropriately controlled according to the thickness of the foamable polyvinylidene fluoride-based resin sheet, and irradiation of the foamable polyvinylidene fluoride-based resin foamed sheet with ionizing radiation may be carried out on one surface of the foamable polyvinylidene fluoride-based resin foamed sheet or on both surfaces thereof. However, in order to uniformly crosslink the foamable polyvinylidene fluoride-based resin foamed sheet in its thickness direction, it is preferable that both surfaces of the foamable polyvinylidene fluoride-based resin sheet is irradiated with ionizing radiation at the same acceleration voltage in the same irradiation dose.

In order to accelerate the crosslinking of the foamable polyvinylidene fluoride-based resin sheet by the irradiation with ionizing radiation, a crosslinking aid may be added. Such a crosslinking aid is not particularly limited as long as it has been conventionally used for the production of foamed sheets, and examples thereof include divinylbenzene, trimethylolpropane trimethacrylate, 1,9-nonanediol dimethacrylate, 1,10-decanediol dimethacrylate, trimellitic acid triallyl ester, triallyl isocyanurate, ethylvinylbenzene, neopentyl glycol dimethacrylate, 1,2,4-benzenetricarboxylic acid triallyl ester, 1,6-hexanediol dimethacrylate, lauryl methacrylate, stearyl methacrylate, diallyl phthalate, diallyl terephthalate and diallyl isophthalate. These may be used singly or in combination of two or more kinds.

Examples of the organic peroxides employable in the method to decompose an organic peroxide include 1,1-bis(t-butylperoxy)3,3,5-trimethylcyclohexane, 1,1-bis(t-butylperoxy)cyclohexane, 2,2-bis(t-butylperoxy)octane, n-butyl-4,4-bis(t-butylperoxy)valerate, di-t-butyl peroxide, t-butyl cumyl peroxide, dicumyl peroxide, $\alpha,\alpha'$-bis(t-butylperoxy-m-isopropyl)benzene, 2,5-dimethyl-2,5-di(t-butylperoxy)hexane, 2,5-dimethyl-2,5-di(t-butylperoxy)hexyne-3, benzoyl peroxide, cumyl peroxyneodecanoate, t-butyl peroxybenzoate, 2,5-dimethyl-2,5-di(benzoylperoxy)hexane, t-butyl peroxyisopropyl carbonate, and t-butyl peroxyallyl carbonate. These may be used singly or may be used in combination of two or more kinds.

The amount of the organic peroxide added is preferably not less than 0.01 parts by mass and not more than 5 parts by mass, and more preferably not less than 0.1 parts by mass and not more than 3 parts by mass, based on 100 parts by mass of the polyvinylidene fluoride-based resin. When the amount of the organic peroxide added is in the above range, crosslinking of the foamable polyvinylidene fluoride-based resin sheet easily proceeds, and the amount of a decomposition residue of the organic peroxide in the resulting crosslinked polyvinylidene fluoride-based resin foamed sheet can be reduced.

Step (C):

The crosslinked foamable polyvinylidene fluoride-based resin sheet having passed through the step (B) is heated to foam the resin sheet.

As the foaming method, a known method can be applied, and specific examples of the methods include a method of heating by hot air, a method of heating by infrared rays, a method using a salt bath and a method using an oil bath. In the case of the method of heating by hot air, the heating temperature only needs to be not lower than the foaming temperature of the thermal decomposition type blowing agent, but is preferably not lower than 200° C. and not higher than 300° C., and more preferably not lower than 220° C. and not higher than 280° C.

Through such steps as above, the crosslinked polyvinylidene fluoride-based resin foamed sheet of the present invention is produced. Through the above steps, furthermore, continuous production becomes possible, and a long sheet can be produced. Since the crosslinked polyvinylidene fluoride-based resin foamed sheet of the present invention has both good flame retardance and good flexibility, it can be applied to all sorts of uses in which these properties are utilized, and for example, the foamed sheet can be used for cushioning materials, sheet materials, etc. applied to the transportation fields of automobiles, railways, airplanes and the like.

EXAMPLES

The contents are hereunder described in more detail with reference to the examples and the comparative examples, but the present invention is in no way limited to those examples.

Measuring methods and evaluation methods for properties in the present examples are as follows.

[Density]

A specific gravity of a crosslinked polyvinylidene fluoride-based foamed sheet having been cut into a size of 10 mm×20 mm was measured using an electron gravimeter. Thereafter, a density was calculated from the following formula.

Density (kg/m$^3$)=(specific gravity of foamed sheet)×1000

[25% Compression Stress]

A 25% compression stress was evaluated in accordance with JIS K6767.

[Hardness]

A hardness was measured by a durometer (type 00) in accordance with ASTM D2240-05.

[Flame Retardance]

A crosslinked polyvinylidene fluoride-based foamed sheet having been cut into a size of width 75 mm×length 300 mm was fitted into a metal support frame and fixed perpendicularly. Subsequently, flame contact was carried out for 60 seconds in such a manner that a tip of a flame having a height of 38 mm was located at the position of 19 mm from the lower end of the sheet. Thereafter, the following combustion duration and combustion distance were evaluated, and when both the acceptance standards were satisfied, the flame retardance was evaluated as A, and when any one of the acceptance standards was not satisfied, the flame retardance was evaluated as B.

(Acceptance Standard of Combustion Duration)

After the flame is taken away, the combustion duration is measured, and an average value of repeated tests of three times is not longer than 15 seconds.

(Acceptance Standard of Combustion Distance)

After the flame is taken away, the test piece is visually observed, and a distance of the burned portion from the lower end of the test piece is measured, and an average value of repeated tests of three times is not more than 152 mm.

When at least one test piece completely burned in the repeated tests of three times, the combustion duration and the combustion distance were each defined as "no record", and the flame retardance was evaluated as B.

[Average Cell Diameter]

A section of a crosslinked polyvinylidene fluoride-based foamed sheet was magnified at a magnification of 100 times using a digital microscope (manufactured by KEYENCE CORPORATION, model number "VHX-5000") and photographed. On the resulting photograph, a straight line was drawn in the direction perpendicular to the thickness of the foamed sheet in such a manner that the actual length in the foamed sheet became 3 mm. Next, diameters of cells present on the straight line were measured. A diameter of a certain cell was defined as a cell diameter of the cell. The diameter was a longest diagonal length of the cell. An average value of diameters of cells present on the straight line was defined as an average cell diameter. A maximum value of diameters of cells present on the straight line was defined as a maximum value of cell diameters within 3 mm width. A minimum value of diameters of cells present on the straight line was defined as a minimum value of cell diameters within 3 mm width. The section is a section in the direction perpendicular to the lengthwise direction of the foamed sheet, the position of the section is a position of the center of the foamed sheet in the lengthwise direction of the foamed sheet, and the position of the center of the straight line is a position corresponding to the center of the section of the crosslinked polyvinylidene fluoride-based foamed sheet. When the thickness of the foamed sheet is less than 3 mm, the same measurement was carried out with regard to the length of the thickness.

[Number of Cells within 3 mm Width]

A section of a crosslinked polyvinylidene fluoride-based foamed sheet was magnified at a magnification of 100 times using a digital microscope (manufactured by KEYENCE CORPORATION, model number "VHX-5000") and photographed. On the resulting photograph, a straight line was drawn in the direction perpendicular to the thickness of the foamed sheet in such a manner that the actual length in the foamed sheet became 3 mm. Next, the number of cells present on the straight line was visually counted, and the resulting value was defined as the number of cells within 3 mm width. The section is a section in the direction perpendicular to the lengthwise direction of the foamed sheet, the position of the section is a position of the center of the foamed sheet in the lengthwise direction of the foamed sheet, and the position of the center of the straight line is a position corresponding to the center of the section of the crosslinked polyvinylidene fluoride-based foamed sheet. When the thickness of the foamed sheet is less than 3 mm, the number of cells was measured in the same manner as above with regard to the thickness of the foamed sheet, and the resulting number of cells was multiplied by a value of (3 mm/thickness (mm) of the foamed sheet) to calculate the number of cells corresponding to the length of 3 mm.

Example 1

In a Laboplastomill, 100 parts by mass of a vinylidene fluoride-hexafluoropropylene copolymer ("KYNAR 2500-20" manufactured by Arkema K.K., melting point (nominal value): 121° C.), 15 parts by mass of azodicarbonamide as a thermal decomposition type blowing agent, and 0.5 parts by mass of 2,6-di-t-butyl-p-cresol as an antioxidant were kneaded. The resulting kneaded material was hot-pressed at 170° C. and 20 MPa, thereby preparing a foamable polyvinylidene fluoride-based resin sheet (referred to as a "foamable sheet" hereinafter) of width 100 mm×length 400 mm×thickness 2 mm. Subsequently, both surfaces of the foamable sheet prepared were irradiated with electron rays of 35 kGy at an acceleration voltage of 750 kV. Thereafter, the foamable sheet was placed in a hot-air oven set at 260° C., for 5 minutes and then rapidly taken out, thereby obtaining a crosslinked polyvinylidene fluoride-based foamed sheet.

Example 2

A crosslinked polyvinylidene fluoride-based foamed sheet was obtained in the same manner as in Example 1, except that the vinylidene fluoride-hexafluoropropylene copolymer was changed to "KYNAR 2750-01" (melting point (nominal value): 134° C.) manufactured by Arkema K.K.

Example 3

A crosslinked polyvinylidene fluoride-based foamed sheet was obtained in the same manner as in Example 1, except that the vinylidene fluoride-hexafluoropropylene copolymer was changed to "KYNAR 2850-00" (melting point (nominal value): 158° C.) manufactured by Arkema K.K.

Example 4

100 Parts by mass of a vinylidene fluoride-hexafluoropropylene copolymer ("KYNAR 2500-20" manufactured by Arkema K.K., melting point (nominal value): 121° C.) were used. 15 Parts by mass of azodicarbonamide as a thermal decomposition type blowing agent, 0.5 parts by mass of 2,6-di-t-butyl-p-cresol as an antioxidant and 2 parts by mass of trimethylolpropane trimethacrylate as a crosslinking aid were used. These were kneaded in a Laboplastomill. The resulting kneaded material was hot-pressed at 170° C. and 20 MPa, thereby preparing a foamable polyvinylidene fluoride-based resin sheet (referred to as a "foamable sheet" hereinafter) of width 100 mm×length 400 mm×thickness 2 mm. Subsequently, both surfaces of the foamable sheet prepared were irradiated with electron rays of 35 kGy at an acceleration voltage of 750 kV. Thereafter, the foamable sheet was placed in a hot-air oven set at 260° C., for 5 minutes and then rapidly taken out, thereby obtaining a crosslinked polyvinylidene fluoride-based foamed sheet.

Example 5

75 Parts by mass of a vinylidene fluoride-hexafluoropropylene copolymer ("KYNAR 2500-20" manufactured by Arkema K.K., melting point (nominal value): 121° C.) and 25 parts by mass of an ethylene-vinyl acetate copolymer ("Evaflex EV460" manufactured by DuPont-Mitsui Polychemicals Co., Ltd., melting point (nominal value): 84° C.) were used. 15 Parts by mass of azodicarbonamide as a thermal decomposition type blowing agent and 0.5 parts by mass of 2,6-di-t-butyl-p-cresol as an antioxidant were used. These were kneaded in a Laboplastomill. The resulting kneaded material was hot-pressed at 170° C. and 20 MPa, thereby preparing a foamable polyvinylidene fluoride-based resin sheet (referred to as a "foamable sheet" hereinafter) of width 100 mm×length 400 mm×thickness 2 mm. Subsequently, both surfaces of the foamable sheet prepared were irradiated with electron rays of 60 kGy at an acceleration voltage of 750 kV. Thereafter, the foamable sheet was placed in a hot-air oven set at 240° C., for 5 minutes and then rapidly taken out, thereby obtaining a crosslinked polyvinylidene fluoride-based foamed sheet.

Comparative Example 1

A crosslinked polyvinylidene fluoride-based foamed sheet was obtained in the same manner as in Example 1, except that the amount of azodicarbonamide compounded was changed to 25 parts by mass.

Comparative Example 2

A crosslinked polyvinylidene fluoride-based foamed sheet was obtained in the same manner as in Example 1, except that both surfaces of the foamable sheet were irradiated with electron rays of 20 kGy at an acceleration voltage of 750 kV.

Comparative Example 3

A crosslinked polyvinylidene fluoride-based foamed sheet was obtained in the same manner as in Example 1, except that both surfaces of the foamable sheet were irradiated with electron rays of 90 kGy at an acceleration voltage of 750 kV.

TABLE 1

|  |  | Example | | | | | Comparative Example | | |
| --- | --- | --- | --- | --- | --- | --- | --- | --- | --- |
|  |  | 1 | 2 | 3 | 4 | 5 | 1 | 2 | 3 |
| Sheet thickness (mm) | | 4.3 | 6.3 | 7.1 | 8.1 | 5.8 | 4.1 | not foamed | 4.2 |
| Density (kg/m$^3$) | | 66 | 47 | 41 | 39 | 62 | 201 | | 198 |
| 25% Compression stress (kPa) | | 55 | 57 | 70 | 41 | 50 | 113 | | 105 |
| Hardness | | 50 | 56 | 63 | 46 | 48 | 63 | | 66 |
| Average cell diameter (μm) | | 309 | 189 | 139 | 439 | 398 | 419 | | 997 |
| Number of cells within 3 mm width | | 7 | 12 | 16 | 6 | 7 | 11 | | 3 |
| {(Maximum diameter) - (minimum diameter)}/ (average cell diameter) | | 1.1 | 2 | 1.8 | 0.9 | 1.6 | 2.4 | | 1.5 |
| Flame retardance | Evaluation | A | A | A | A | A | A | | A |
| | Combustion duration (second(s)) | 0 | 0 | 0 | 0 | 0 | 0 | | 0 |
| | Combustion distance (mm) | 65 | 88 | 94 | 101 | 110 | 60 | | 85 |

In Table 1, the combustion duration and the combustion distance each indicate an average value of three times. A case where there is no record even once out of three times is represented by "NG".

As shown in Examples 1 to 5, by foaming a polyvinylidene fluoride-based resin containing a vinylidene fluoride-hexafluoropropylene copolymer to give a density of not more than 180 kg/m$^3$, a foamed resin sheet excellent in flexibility and flame retardance could be obtained. On the other hand, in Comparative Example 1, foaming to give a density of not more than 180 kg/m$^3$ could not be carried out, and therefore, flexibility could not be enhanced. In Comparative Example 2, since the dose of electron rays was low, foaming could not be carried out, and therefore, a crosslinked polyvinylidene fluoride-based foamed sheet could not be prepared. In Comparative Example 3, foaming to give a density of not more than 180 kg/m$^3$ and an average cell diameter of not less than 100 μm and not more than 500 μm could not be carried out, and therefore, flexibility could not be enhanced.

The invention claimed is:

1. A crosslinked polyvinylidene fluoride-based resin foamed sheet obtained by crosslinking and foaming a polyvinylidene fluoride-based resin composition comprising a polyvinylidene fluoride-based resin, wherein
the polyvinylidene fluoride-based resin comprises a vinylidene fluoride-hexafluoropropylene copolymer,
a density of the crosslinked polyvinylidene fluoride-based resin foamed sheet is not more than 80 kg/m$^3$, and
an average cell diameter of the crosslinked polyvinylidene fluoride-based resin foamed sheet is not less than 150 μm and not more than 500 μm.

2. The crosslinked polyvinylidene fluoride-based resin foamed sheet according to claim 1, wherein a number of cells within 3 mm width of the crosslinked polyvinylidene fluoride-based resin foamed sheet is not less than 5 and not more than 20.

3. The crosslinked polyvinylidene fluoride-based resin foamed sheet according to claim 1, wherein cell diameters within 3 mm width of the crosslinked polyvinylidene fluoride-based resin foamed sheet satisfy the following formula:

{(maximum value of cell diameters within 3 mm width)−(minimum value of cell diameters within 3 mm width)}/(average cell diameter) ≤2.2.

4. The crosslinked polyvinylidene fluoride-based resin foamed sheet according to claim 1, having a 25% compression stress, based on JIS K 6767, of not more than 100 kPa and a hardness, based on ASTM D2240-05, of not more than 70.

5. The crosslinked polyvinylidene fluoride-based resin foamed sheet according to claim 1, wherein the vinylidene fluoride-hexafluoropropylene copolymer comprises not less than 25 mass % of a vinylidene fluoride-hexafluoropropylene copolymer having a melting point of not lower than 80° C. and not higher than 160° C.

6. The crosslinked polyvinylidene fluoride-based resin foamed sheet according to claim 1, wherein the polyvinylidene fluoride-based resin composition comprises a polyolefin-based resin, and
a content of the polyolefin-based resin based on the total of the polyvinylidene fluoride-based resin and the polyolefin-based resin is not more than 50 mass %.

7. The crosslinked polyvinylidene fluoride-based resin foamed sheet according to claim 1, having a degree of crosslinking of not less than 5 mass % and not more than 70 mass %.

8. The crosslinked polyvinylidene fluoride-based resin foamed sheet according to claim 1, wherein the polyvinylidene fluoride-based resin composition further comprises a thermal decomposition type blowing agent.

9. The crosslinked polyvinylidene fluoride-based resin foamed sheet according to claim 1, wherein the polyvinylidene fluoride-based resin composition further comprises a crosslinking aid.

10. A process for producing the crosslinked polyvinylidene fluoride-based resin foamed sheet according to claim 1, comprising in this order:
(A) melt-kneading a polyvinylidene fluoride-based resin comprising a vinylidene fluoride-hexafluoropropylene copolymer and a thermal decomposition type blowing agent and forming the resulting kneaded material into a sheet-like shape to produce a foamable polyvinylidene fluoride-based resin sheet;
(B) crosslinking the foamable polyvinylidene fluoride-based resin sheet; and
(C) heating the crosslinked foamable polyvinylidene fluoride-based resin sheet to foam the resin sheet.

* * * * *